United States Patent Office 3,520,031
Patented July 14, 1970

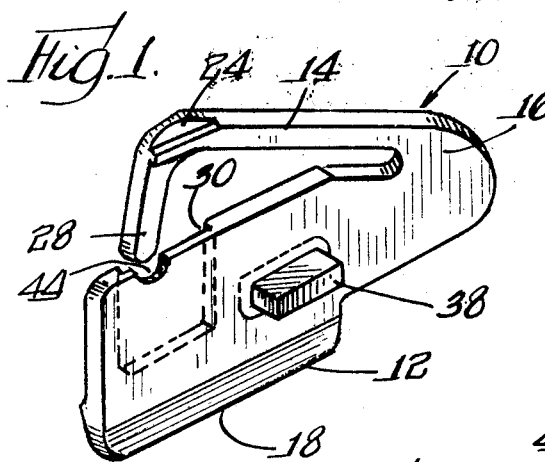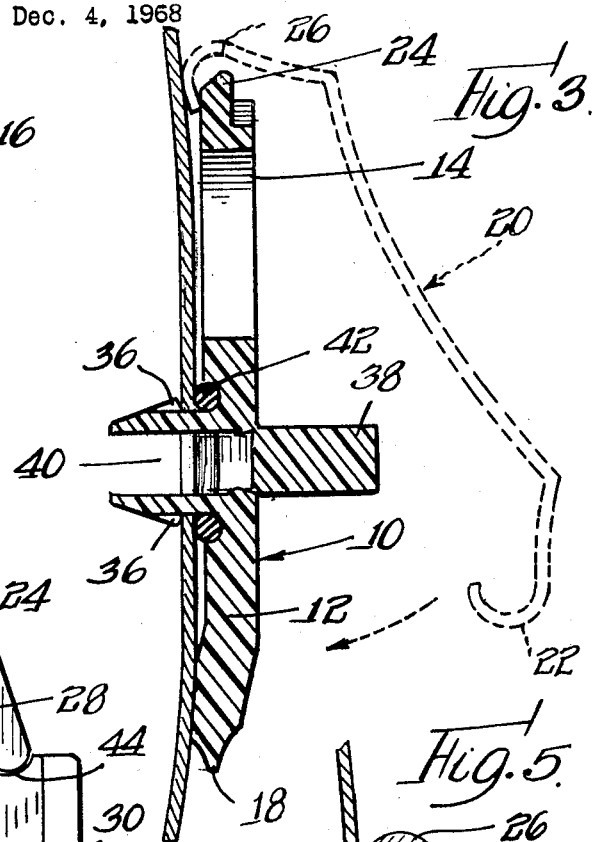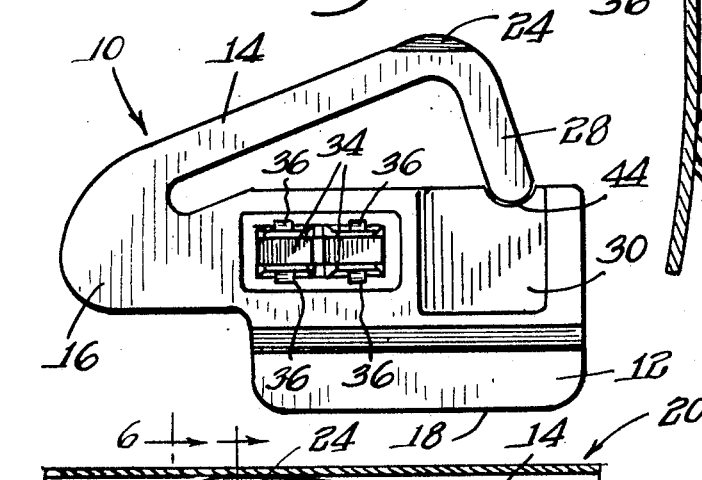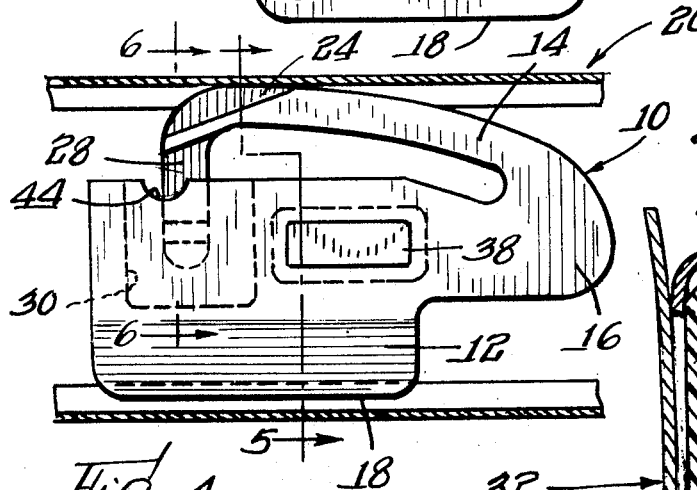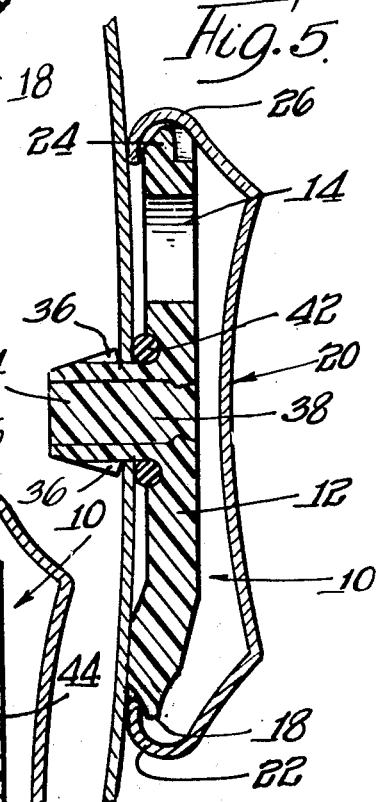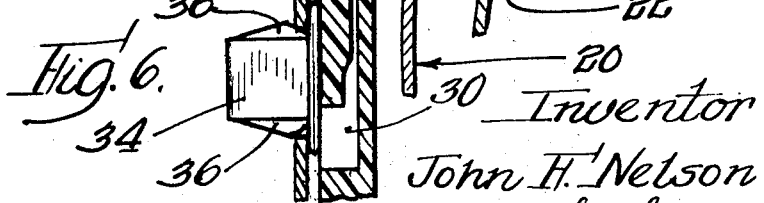

3,520,031
SPRING CLIP
John Frederick Nelson, Des Plaines, Ill., assignor to Illinois Tool Works Inc., Chicago, Ill., a corporation of Delaware
Filed Dec. 4, 1968, Ser. No. 781,114
Int. Cl. A44b *19/06*
U.S. Cl. 24—73
9 Claims

ABSTRACT OF THE DISCLOSURE

The present invention relates generally to spring clips adapted for mounting channeled workpieces such as molding strips and the like. The embodiment of the invention disclosed herein comprises a one-piece plate-like member, one section of which has a margin for engaging one flange of a channeled workpiece, and another section of which is in the nature of an arm hingedly supported at one extremity by the first-mentioned section, said arm diverging from the work engaging margin of the first-mentioned section, and at its free extremity providing a margin or edge for engaging the opposite flange of the channeled member. Another portion of the arm extends toward the first-mentioned section and is adapted to superimpose and in fact be trapped beneath said section when a channeled workpiece is supported by the clip. Means is also provided in the nature of a resilient shank element for securing the plate-like member to an apertured panel.

---

The present invention is directed toward spring type clips which are self-adjusting to accommodate channel members of varying widths. Spring clips of the type contemplated by the present invention have a very practical application in instances where channeled molding strips are to be secured to automobile bodies and the like. Metallic spring clips, known as molding clips, have heretofore been in common use.

It is an object of the present invention to provide spring clips of the type referred to above which lend themselves structurally to production by conventional plastic molding methods and also to so form such clips as to assure sufficient strength to prevent lateral displacement of the spring arm of the clip.

More specifically, the invention contemplates a spring clip of the type referred to above wherein the free extremity of a spring clip arm may be locked in position against unauthorized lateral displacement and thus assure permanent mounting of a channeled member upon an apertured work panel.

The present invention also contemplates the provision of spring clips of the type referred to above, wherein the body of the clip which is adapted to traverse the oppositely disposed flanges of a channel member and the fastener therefor may be molded in one piece.

The foregoing, and other objects and advantages, will be more apparent when considered in connection with the accompanying drawing, wherein:

FIG. 1 is a perspective view of a spring clip which is representative of one embodiment of the present invention;

FIG. 2 is a side view of the spring clip from the rear of the clip as shown in FIG. 1;

FIG. 3 is an enlarged transverse sectional view of the spring clip shown in preliminary association with an apertured work panel and a channeled workpiece shown in dotted line prior to its final association with the clip;

FIG. 4 is a side view of the clip as seen in FIG. 1, in final secured position within a channeled workpiece which is in section so as to expose parts otherwise hidden;

FIG. 5 is an enlarged vertical sectional view taken substantially along the line 5—5 of FIG. 4; and FIG. 6 is a fragmentary vertical sectional view taken substantially along the line 6—6 of FIG. 4.

Referring now to the drawing more in detail, wherein like numerals have been employed to designate similar parts throughout the various figures, it will be seen that a spring clip representative of one embodiment of the present invention is designated generally by the numeral 10. The clip 10 includes a plate-like member which comprises a section 12 and a yieldable arm member 14 hingedly connected at 16 to the section 12. The section 12 is provided with an elongated margin 18 designed for engagement with one side or flange of a channeled workpiece or molding designated generally by the numeral 20. The margin 18 is designed to engage one flange 22 of the channeled workpiece 20, and the free extremity 24 of the arm 14 is adapted to engage the opposite flange 26 of the channel member 20.

It will be noted that the arm 14 diverges from a line defined by the margin or edge 18, and that the arm 14 also includes a portion 28 which extends toward the section 12. The free extremity of the arm portion or member 28 is adapted to overlie or superimpose a portion of the clip section 28 when the clip is mounted within a complementary channeled member or molding strip as shown in FIG. 4. Attention is also directed to the fact that the member 28 of the arm 14 is adapted to be received within a recess 30 provided in the section 12.

In the present embodiment, the recess 30 is formed on the side of the section 12 which normally faces the work panel upon which the clip is to be mounted. In the drawing this work panel is designated generally by the numeral 32. In this manner the free extremity of the portion 28 of the arm 14 becomes interlocked or trapped within the recess 30 as shown in FIG. 4, thereby preventing lateral displacement of the arm with respect to the section 12. This structural arrangement contributes materially to the rigidity and hence the holding strength of the clip.

A split stud member 34 is formed integral with and extends laterally of the section 12 as clearly shown in the drawing. This stud member 34 is bifurcated so as to form two portions as indicated in FIG. 2, each of said portions having oppositely disposed shoulders 36. When the shank is telescopically associated within a complementary aperture of the work panel 32, the shoulders 36 spring radially outwardly into interlocking engagement with the area of the panel 32 surrounding the work aperture. As shown in FIG. 3, the clip is formed with an integral drive block or member 38. This drive block 38 has a fracturable connection with the section 12 of the clip, so that when the block is driven into an opening 40 of the shank 34 to the position shown in FIG. 5, the locking shoulders 36 are secured against inward displacement. In other words, the shank 34 is secured against collapsing.

In instances where it is desirable to establish a seal between the clip and the area adjacent the work aperture a suitable sealing ring 42 may be employed. When the spring clip is to be used in association with automobile bodies and the like, it becomes particularly important to prevent moisture leakage through the work aperture. While the clip per se may be made in one piece, of suitable non-corrosive plastic material, the panels to which the clip is applied are often metallic and hence subject to corrosion.

It will be apparent from the foregoing description that the present invention contemplates the provision of a spring clip which may be manufactured in one piece from suitable plastic material. Also the shiftability of the arm 14 makes it possible for one clip to accommodate channel members or molding strips of various widths. By employing the arm extension 28, which may be forced into the pocket provided by the recess 30, as shown in FIG. 4, the arm is secured against lateral displacement with respect to the remainder of the clip body. In other words, trapping the extension 28 of the spring arm 14 under the clip section 12 serves to enhance the power of the clip to hold a molding strip in position upon a work panel.

It will be noted that the extremity of the arm extension 28 is struck from the upper margin of the section 12. The entire clip is produced in a plastic mold and after the molding operation has been completed, the extremity of the member 28 is integral with the section 12. This integral connection is severed by a simple stamping operation, thereby forming a semicircular kerf 44 in the upper margin of section 12. The stamping operation forces the free end of the extension 28 laterally into alignment with the pocket 30.

The invention is claimed as follows:

1. A spring clip including a one-piece plate-like member for traversing the space between opposed flanges of a channeled workpiece, said member having a first section providing a margin for engaging one flange of a channeled workpiece and a second section in the form of a shiftable arm formed integral with and extending from said first section, said arm being hingedly connected to and normally diverging from the margin of said first section so as to provide an abutment in the vicinity of the free extremity thereof for yieldably engaging the opposite flange of the channeled workpiece, said arm having a locking member extending from its flange engaging abutment toward said first section adapted to superimpose said first section when the clip is mounted within a channeled workpiece, and means for securing said plate-like member to an apertured work panel.

2. A spring clip as set forth in claim 1, wherein the first section is provided with a pocket for accommodating the locking member extending from the arm.

3. A spring clip as set forth in claim 1, wherein the first section comprises a substantial portion of the one-piece plate-like member.

4. A spring clip as set forth in claim 3, wherein the arm is relatively narrow compared with the width of the first section.

5. A spring clip as set forth in claim 1, wherein the plate-like member and the means for securing said member to an apertured work panel are integral.

6. A spring clip as set forth in claim 1, wherein the flange engaging margin of the first section is longitudinal in extent for engaging a complementary longitudinal portion of a chaneled work surface.

7. A sprig clip as set forth in claim 1, wherein the plate-like member and securing means therefor comprise an integral piece of molded nonmetallic material.

8. A spring clip as set forth in claim 1, wherein the means for securing the plate-like member to an apertured work panel comprises a radially yieldable shank element extending laterally of said plate-like member.

9. A spring clip as set forth in claim 8, wherein an annular sealing member is operatively associated with said shank element.

References Cited

UNITED STATES PATENTS

| | | | |
|---|---|---|---|
| 2,947,048 | 8/1960 | Ellis | 52—718 XR |
| 3,203,304 | 8/1965 | Rapata | 24—73 XR |
| 3,279,011 | 10/1966 | Flora. | |
| 3,280,436 | 10/1966 | Seckerson et al. | 24—73 |

DONALD A. GRIFFIN, Primary Examiner

U.S. Cl. X.R.

52—718; 85—5